(No Model.)  2 Sheets—Sheet 1.

C. H. THOMPSON.
SEEDING MACHINE AND FERTILIZER DISTRIBUTER.

No. 258,153.  Patented May 16, 1882.

Charles H. Thompson,
INVENTOR,
by Louis Bagger & Co.
ATTORNEYS.

(No Model.) 2 Sheets—Sheet 2.
C. H. THOMPSON.
SEEDING MACHINE AND FERTILIZER DISTRIBUTER.
No. 258,153. Patented May 16, 1882.
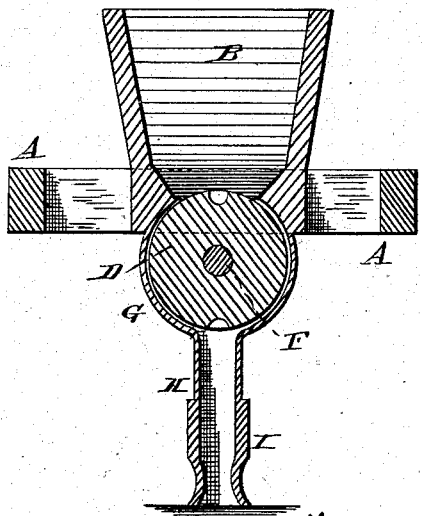
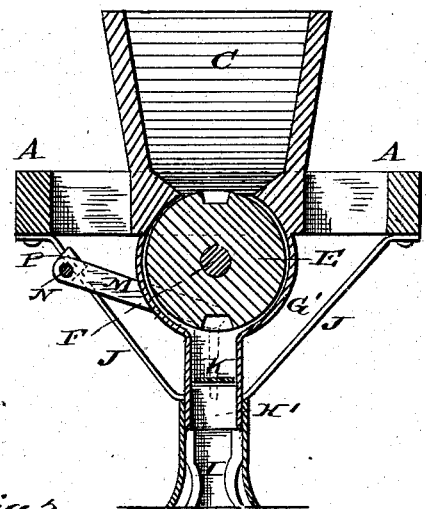
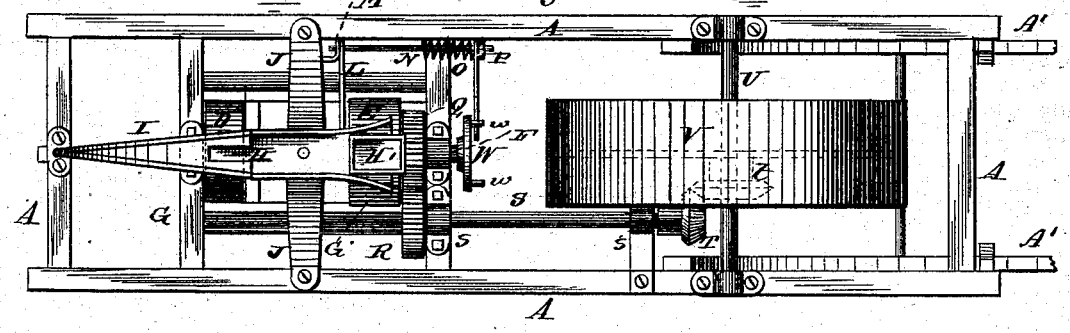
WITNESSES:
Charles H. Thompson,
INVENTOR,
by Louis Bagger & Co.
ATTORNEYS.

UNITED STATES PATENT OFFICE.

CHARLES H. THOMPSON, OF CLAREMONT, NEW HAMPSHIRE.

SEEDING-MACHINE AND FERTILIZER-DISTRIBUTER.

SPECIFICATION forming part of Letters Patent No. 258,153, dated May 16, 1882.

Application filed March 11, 1882. (No model.)

*To all whom it may concern:*

Be it known that I, CHARLES H. THOMPSON, of Claremont, in the county of Sullivan and State of New Hampshire, have invented certain new and useful Improvements in Combined Seeding-Machine and Fertilizer-Distributer; and I do hereby declare that the following is a full, clear, and exact description of the invention, which will enable others skilled in the art to which it appertains to make and use the same, reference being had to the accompanying drawings, which form a part of this specification, and in which—

Figure 1:
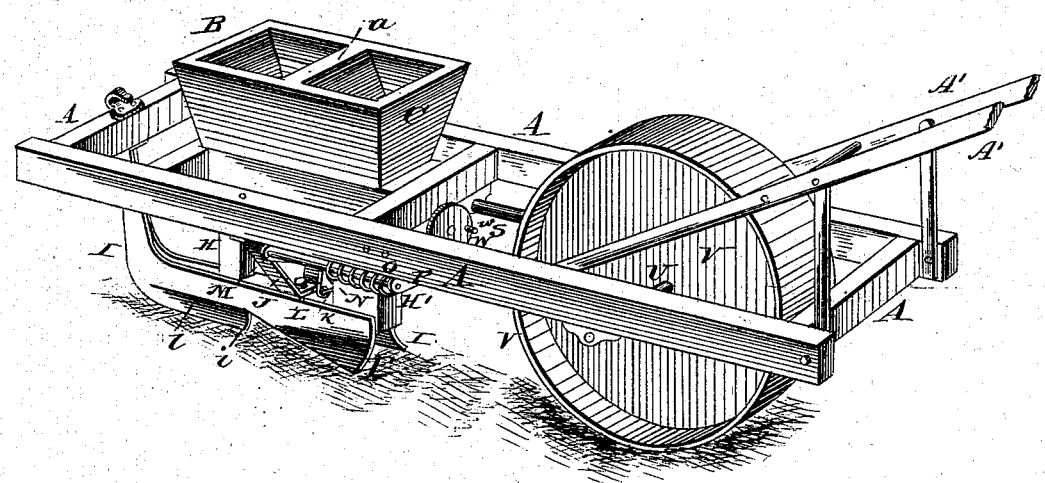
Figure 2:
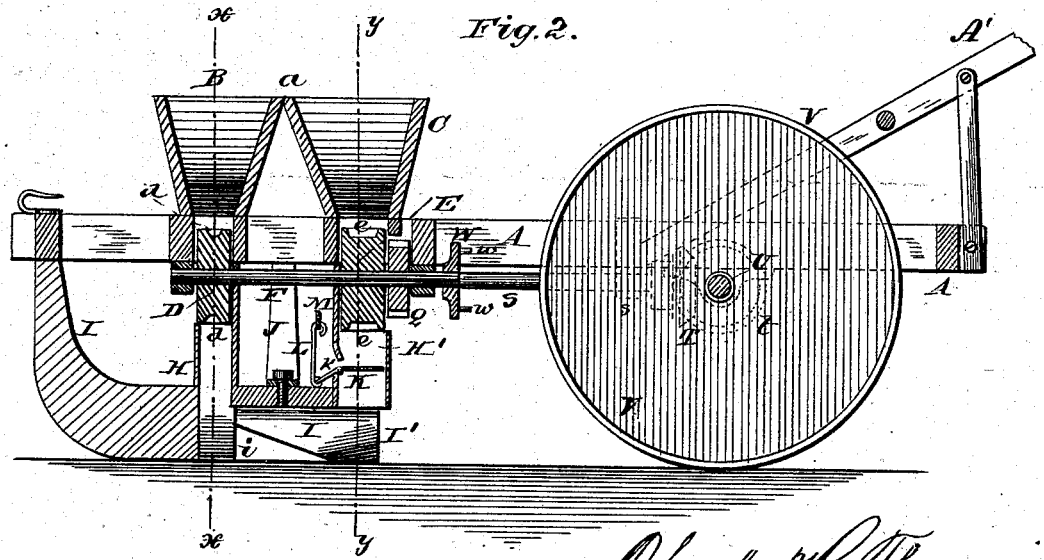

Figure 1 is a perspective view of my improved machine. Fig. 2 is a longitudinal vertical section of the same. Fig. 3 is a vertical cross-section through line $x\,x$, Fig. 2. Fig. 4 is a similar section through line $y\,y$ in the same figure, and Fig. 5 is a plan of the under side of the machine.

Similar letters of reference indicate corresponding parts in all the figures.

My invention has relation to combined seeding-machines (or corn-planters) and fertilizer-distributers; and it consists in the improvements hereinafter more fully described and claimed, whereby the seed and fertilizing material are kept separate, not only while in the machine, but during the process of dropping, the dropping devices and mechanism being so combined and arranged that the fertilizer is dropped directly over the seed, after a thin layer of earth shall first have been deposited over the latter, owing to the peculiar construction of the plow through which the seed is deposited. After dropping the fertilizer the whole is covered with earth in the usual manner and by any desired means.

In the two sheets of drawings hereto annexed, A represents the frame of the machine, which may be of any desired construction and is provided with suitable handles, A' A'. Upon this frame are mounted the seed-hopper B and fertilizer-hopper C, which are separated by a wall or diaphragm, $a$, having sloping sides reaching down to the open bottoms of the respective hoppers.

D is the seed-dropper, and E the fertilizer-dropper, both of which consist of cylinders having circumferential cells or cavities $d$ and $e$, and mounted upon a common shaft, F. The cells $d$ and $e$ are of such size or capacity as to receive their proper proportion of seed and fertilizer, respectively, and the cylinders are incased in boxes or jackets G and G', of corresponding shape and size, from which spouts H and H' lead down to the plow I, the rear end of which is connected to frame A by diverging braces J J.

Inside of the fertilizer-spout H' is placed a hinged valve, K, which has an arm, $k$, extending out through a slot in the spout, to the outer end of which is hinged a rod, L, connecting it with an arm, M, which is rigidly secured at one end of a rock-shaft, N, the other end of which is encircled by a spiral spring, O. One end of this spring is fixed in the frame of the machine, and the other or free end bears against an arm, P, rigidly secured to the outer end of shaft N, and operates to depress said arm or force it in a downward direction.

Upon the shaft F is keyed a cog-wheel, Q, which gears with another cog-wheel, R, that is mounted at one end of a shaft, S, journaled in boxes $s\,s$ on the under side of the frame. At the opposite end of shaft S is a bevel-pinion, T, which meshes with the bevel-pinion $t$, keyed upon the axle U of the roller or covering-wheel V, which also operates as the drive-wheel of the machine.

W is a disk, which is secured upon the inner end of shaft F, and is provided with two pins, $w\,w$, projecting from its face. As shaft F, with disk W, rotates the pins or projections $w$ will alternately strike the inner end of arm P, thereby tilting or elevating said arm, and with it rocking shaft N in its boxes or bearings. This causes arm M to draw upon the rod L, which is attached to its outer end, and connects with arm $k$ of valve K, thus opening the hinged valve and permitting the fertilizer which is deposited in the spout H' from the fertilizer receptacle or hopper C to drop through it into the ground.

By the use of the valve K and mechanism for operating it intermittingly, substantially as described, the rotary fertilizer-dropper E, with its cells $e$, may be dispensed with, or a sliding dropper may be substituted for the rotary dropping-cylinder, or the dropper-cylinder and intermittingly-operating valve may advantageously be used in conjunction, as in the machine illustrated in the drawings.

The plow I is cut off or notched to form a shoulder, $i$, just back of the seed-spout H, and a groove (shown at $l$) extends from said shoulder to the forward end or colter end of the plow. Back of the shoulder or offset $i$ are two wing-shaped shears, I' I', one on each side, the broad rear ends of which flare outwardly and receive between them the lower end of the fertilizer-spout H'. By this construction of the plow, as it advances through the soil, two beads or rolls of earth are formed by the hollowed part or grooves $l\ l$ on each side of the furrow projecting inwardly into this, between which the seed is dropped through spout H into the bottom of the furrow. As the plow advances the shears I' I' will cut off the bead of earth formed by the grooves $l$, which drops down and lightly covers the seed deposited in the furrow; and as the machine still further advances, and the mouth of the fertilizer-spout H' is brought over the precise spot where the seed is dropped, the relative arrangement of the droppers D and E (and valve K, when employed) is such that the fertilizer will be dropped or deposited precisely over the seed upon the thin layer of soil with which it has been previously covered. This is in its turn covered by the covering-roller or ground-wheel V in the usual manner.

Having thus described my invention, I desire it to be understood that I do not confine myself to the precise construction and combination of parts herein shown, inasmuch as they may be varied in several respects without deviating from the spirit of my invention. Thus reciprocating slides and suitable mechanism for operating the same may be used in place of the rotary hoppers D and E to feed the seed and fertilizer intermittingly into the spouts; but it is essential that, irrespective of their detailed construction, the seed and fertilizer dropping mechanism be so combined and arranged that the fertilizer shall be deposited immediately over or upon the seed, with the thin layer of earth separating them as described. The advantage of this is that the seed, not being in immediate contact with the latter, will not deteriorate by the decomposition of the chemical agents in the fertilizer, but yet receive all the benefit therefrom, as the dissolved fertilizing material filters down through the intervening layer of soil and fertilizers the seed deposited underneath it.

What I claim as my invention, and desire to secure by Letters Patent of the United States, is—

1. The plow I, constructed with the shoulder or offset $i$, parallel concavities or grooves $l\ l$, and wing-shaped shears I' I', substantially as shown and set forth.

2. The combination, in a combined seeding-machine and fertilizer-distributer, of the plow I, constructed with the shoulder or offset $i$, parallel concavities or grooves $l\ l$, and wing-shaped shears I' I', seed-spout H, arranged in front of the shoulder $i$ and between the concave grooves $l\ l$, and fertilizer-spout H', arranged between the flaring rear ends of wings I' I', substantially as and for the purpose herein shown and set forth.

In testimony that I claim the foregoing as my own I have hereunto affixed my signature in presence of two witnesses.

CHARLES H. THOMPSON.

Witnesses:
WILLIAM E. AINSWORTH,
MELVIN A. NOTT.